Aug. 31, 1926.
S. S. PAINE
1,598,248
MEASURING GAUGE FOR ROLLS
Filed Dec. 3, 1924
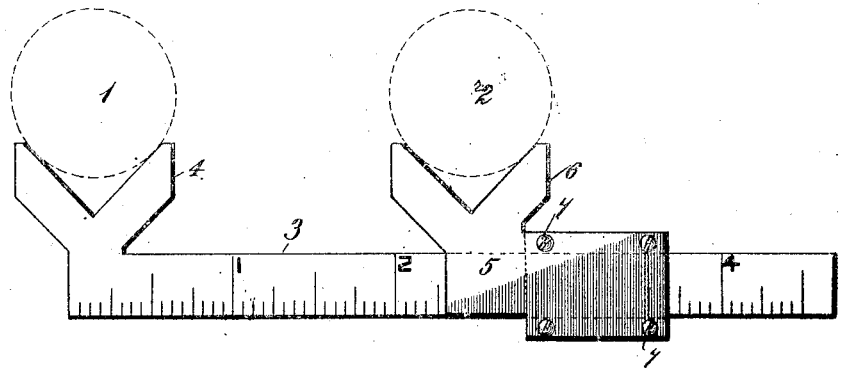
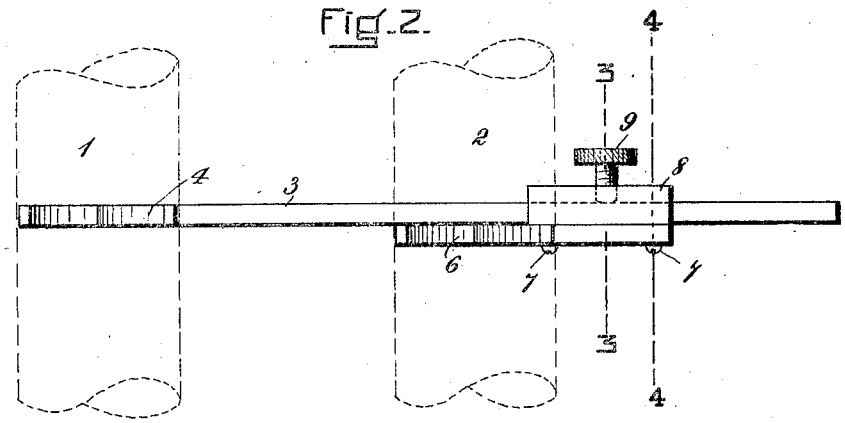
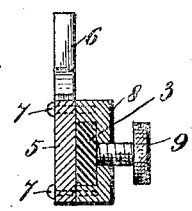
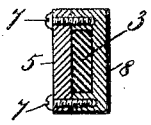
INVENTOR=
Sidney S. Paine
By
ATTORNEYS=

Patented Aug. 31, 1926.

1,598,248

UNITED STATES PATENT OFFICE.

SIDNEY S. PAINE, OF WINCHESTER, MASSACHUSETTS.

MEASURING GAUGE FOR ROLLS.

Application filed December 3, 1924. Serial No. 753,614.

In textile machines there are many instances where two or more rolls are so mounted and positioned that the space between them may be adjusted within certain limits according to the work to be done and must be adjusted so that they are exactly parallel. In the adjustment of such rolls it is customary to regulate the spaces between the centers of the rolls and, as the material to be worked upon is often extremely thin, it is necessary that the adjustment of the rolls be of great accuracy. I have found that it is better to regulate this spacing and parallelism by utilizing the surfaces of the rolls to bring their centers into proper relation and for this purpose I have invented the gauge below described.

My invention will be understood by reference to the drawings in which—

Figure 1 is an elevation, and

Fig. 2 is a plan of a gauge embodying it,

Figs. 3 and 4 being sections on lines 3—3 and 4—4 of Fig. 2.

In the drawings there are shown at 1 and 2 in dotted lines the ends of two rolls the parallelism and distance apart of which are to be measured or adjusted. 3 is a rule or standard which may be calibrated in any desired way. One end of this rule terminates in a yoke piece 4 of sufficient size and proper shape to receive the roll as shown in Fig. 1 where the roll sets into the yoke piece 4. On this rule 3 is mounted a slide piece 5 one end of which carries in like manner a yoke piece 6 in all respects like the yoke piece 4 and of equal length therewith. This slide piece is preferably calibrated and has attached to it by screws 7 a clamping member 8 through which passes a set screw 9, this construction being such that when the set screw 9 is loose the slide piece 5 carrying the end of the roll may be moved along the rule 3 and when a proper position has been reached it may be clamped in place by the set screw 9 and a reading made on the standard whereby the distance apart of the rolls may be determined.

To secure the parallelism of two rolls, the distance apart of two rolls at one end may be determined as shown in Fig. 1 and the set screw tightened. The gauge may then be removed and applied to the other ends of the rolls which may be set at exactly the same distance apart.

It will be understood that in practice the bearings of one of these rolls, say roll 1, will usually be in a fixed position and, the desire being that a second roll shall be at a certain distance from it, the gauge may be set with the yoke piece at the proper distance and, the bearing of the second roll 2 being loosened at one end, that end of the second roll will be moved into the yoke piece 6 which is at this time clamped to the rule 3 at the desired distance from the yoke piece 4.

The same operation will take place at the further ends of the rolls and thereby the parallelism of the rolls will be assured.

It is evident that other means of embodying my invention will occur to those skilled in the art, the main feature of it being the use of two similar yoke pieces or rests and the capability of adjustment of one of these rests with relation to the other preferably with a scale by which this adjustment or relation may be measured.

I have found that the rests or yoke pieces may be conveniently made as shown in the drawings wherein the arms of the yokes are at right angles to each other and form an angle of 45 degrees with the rule 3, but this shape is not essential so long as the supporting surfaces in the two yoke pieces are such as to allow the self-centering of the rolls therein and provided also the arms of each yoke piece are long enough to engage the surface of the roll it is to support at points of tangency, for my gauge may be used with rolls of different diameters.

In using the word "rule" to describe the member on which the slide piece runs, I do not mean to limit myself to a member carrying a scale as under certain circumstances the scale may be omitted. Moreover, in certain kinds of work the second yoke may be permanently fixed to the standard.

What I claim as my invention is:—

1. The gauge above described comprising a rule having a laterally-directed, V-shaped, roll-engaging member at one end and a slide piece adapted to be moved along said rule and carrying a similar roll engaging member, and means for clamping said slide to said rule.

2. The gauge above described comprising a rule having a laterally-directed V-shaped roll-engaging member at one end and a slide piece adapted to be moved along said rule and carrying a similar roll engaging member, and means for clamping said slide to said rule, said rule being calibrated.

3. The gauge above described comprising a rule having a laterally-directed V-shaped roll-engaging member fixed thereto at one end and a slide piece adapted to be moved along said rule and carrying a similar roll engaging member, said roll engaging members being adapted to engage simultaneously the two rolls, and means for clamping said slide and said rule.

4. A gauge comprising yoke pieces each open in the same direction and adapted to receive a roll and means for supporting said yoke pieces whereby the distance between the centers of said rolls may be adjusted, each yoke piece comprising two divergent arms adapted to engage tangentially the peripheral surface of the roll.

SIDNEY S. PAINE.